Oct. 11, 1938.　　R. J. McRAE　　2,132,539
PRODUCTION OF IONS
Filed Jan. 27, 1936　　7 Sheets-Sheet 2

INVENTOR
Randolph J. McRae
BY Kenyon & Kenyon
ATTORNEYS Oct. 11, 1938.  R. J. McRAE  2,132,539
PRODUCTION OF IONS
Filed Jan. 27, 1936  7 Sheets-Sheet 3

Oct. 11, 1938.   R. J. McRAE   2,132,539
PRODUCTION OF IONS
Filed Jan. 27, 1936   7 Sheets-Sheet 7

Fig. 11.

INVENTOR
Randolph J. McRae
BY Kenyon & Kenyon
ATTORNEYS

Patented Oct. 11, 1938

2,132,539

UNITED STATES PATENT OFFICE 2,132,539

PRODUCTION OF IONS

Randolph J. McRae, Jersey City, N. J., assignor, by mesne assignments, to General Patents, Limited, Nassau, Bahamas, a corporation of Bahama Islands Application January 27, 1936, Serial No. 61,000

18 Claims. (Cl. 128—172.1)

This invention relates broadly to the production of ions and the adsorption thereof on organisms.

The ionic content of atmospheric air is subject to somewhat wide variations depending upon several conditions such as sunshine, altitude, ventilation, and climatic conditions. On cloudy days the tendency is for the negative ion content to be less. At higher altitudes there is a tendency toward increase of the negative ion content and in mountainous regions the increase of negative ions per unit volume is marked. Lack of ventilation within an occupied room causes a rapid decrease of the negative ion content of the air therein, and a dropping barometric pressure is usually accompanied by an increase of positive ions in the atomphere near the earth.

The ionic content of air has an effect on the health of human organisms. Air containing an excess of negative ions may produce beneficial effects in certain instances and in similar instances air containing an excess of positive ions may produce detrimental effects. The beneficial effects of negative ions are especially marked when the ion is applied to human or other organisms according to this invention.

The term "ion" as used herein is meant to include the electron, small gaseous ions of relatively high mobility, large ions of low mobility, ions containing a liquid or solid nucleus, and any charged particle that is formed in the operation of this invention.

Air or other fluid may be ionized by any one of several methods. Normally, the methods used produce both positive and negative ions and in order to obtain a preponderance of ions of chosen polarity, it is usually necessary to remove the ions of opposite polarity before substantial recombination has taken place. The size to which an ion may grow depends on several conditions, for example, upon the size and characteristics of the available nuclei present, and the ultimate size is probably limited largely by the thermodynamics of the system.

According to this invention, ions of various sizes and types are produced and nuclei are formed and presented for the affixation of ions thereon, thereby producing large ions of low mobility. Such nuclei may consist of vaporized molecules of a liquid, such as oil, or may consist of molecules formed by reaction, such as the product of reaction of ozone with di-pentine. Large ions formed by the clustering of smaller ions around a nucleus have longer life due to their low mobilities and constitute an effective carrier and preserver of the negative electron until coming into contact with an adsorbing surface, such as an organism, as will be set forth hereinafter.

Energy is required to remove the charge from an ion and according to this invention, the removal of the charge from an ion upon contacting an organism may be facilitated by imposing a voltage potential on the organism. The removal of the charge, or electron, from an ion is accompanied by radiation and, accordingly, in this invention when the combination of a nucleus and an ion comes into contact with an organism a radiation is generated on the part of the organism so contacted. Such radiation may be expedited by imposing on the organism a voltage potential of a polarity opposite to that carried by the ion.

In the case of negative ions fixed on nuclei, for example, coming into contact with an organism on which has been imposed a positive voltage potential, negative charges will enter the organism at the points of contact and flow therethrough toward the location at which the positive voltage potential is imposed. The so contacted points constitute the cathodes and because the ions are dispersed throughout a current of air and particles directed against the organism, large numbers of cathode points are thereby established on the organism.

In the application of this invention, it is desirable in some instances to utilize a nucleus that has therapeutic value in itself. For example, the reaction of ozone with suitable substances, such as pinene, produces oxidation and addition products which have therapeutic value and which also constitute suitable nuclei for the affixing of ions thereto. In this manner, the therapeutic value of the ions as applied in this invention is augmented by the therapeutic value of the nuclei.

When treating an organism with ions of chosen polarity it is desirable to remove ions of opposite polarity from the carrying medium in order that a preponderance of ions of chosen polarity may be available for contacting the organism. By placing a voltage potential on the organism selective adsorption of ions on the organism is obtained. For example, consider the treatment of an organism with negative ions in which case positive ions are removed from the carrying medium and a positive voltage potential is placed on the organism. The positive voltage potential on the organism will attract negative ions but will repel positive ions. It is thus seen that a positive voltage potential on the organism has several functions, such as the attraction of negative ions, the repulsion of positive ions and the expediting of radiation.

Air may be ionized by any one of the several means or by a combination of such means. For example, an electrical discharge such as the so-called silent or brush discharge may be utilized. The degree of ionization in a brush discharge is high but recombination and other forces destructive to the ion are marked and relatively few ions are available shortly after the air escapes from the discharge. Air may be ionized by the action of the electric field with or without the ejection of electrons into the air stream. The ionized air may be caused to flow into contact with a body of liquid thereby causing vaporization of the liquid so that vaporized particles of the liquid and the ionized air become commingled and the ions become fixed on liquid particles. The ionized air may contain ozone which, when coming into contact with a liquid reactive with ozone will produce chemical reaction, thereby yielding solid or liquid particles that commingle with vaporized particles of the liquid and ions may be affixed to the particles which then become nuclei of the ions.

Upon vaporizing a liquid with an ionized gas or upon reacting a liquid with a reactive gas, for example, a gas containing ozone, new ions may be produced. Accordingly, it is often desirable to remove ions of chosen polarity from the commingled vapors and gases so that the resultant commingled vapors and gases will selectively contain larger portions of either positive or negative ions.

According to this invention the gas, after it has been ionized, may have either positive or negative ions removed therefrom before coming into contact with the material to be evaporated and/or reacted; or the ionized gas may be directly contacted with the material without the removal of ions therefrom. In either event, the commingled ion containing gas and evaporated or reacted particles may be subjected to treatment whereby either positive or negative ions, as may be selected, are removed. The commingled gases and particles may then be subjected to further ionization whereby new ions are produced and the particles produced by evaporation or by reaction become nuclei for larger ions.

In order more completely to supply the nuclei with their full capacity for ions a second stream of air may be combined with the stream carrying the nuclei and the two streams so commingled may be ionized by any one of several means, for example, by the action of the electric field, or by the injection of electrons thereinto or by a combination of both methods. One combination of both methods, for example, may be effected by passing the combined streams through a metal tube axially of which is arranged a fine wire on which negative electrical charges are periodically impressed in a novel manner by the use of this invention. The strong field created around the fine wire and the ejection of electrons from the said wire cause ions to be formed in the stream, some of which are smaller free air ions and some of which are larger ions formed with the liquid or solid vaporized particles as nuclei. The ratio of volume of the air stream and the stream carrying the nuclei may be so chosen that a preponderance of the liquid or solid particles become effective nuclei of larger ions.

Accordingly, one object of this invention is to provide a process and apparatus whereby ions of chosen polarity may be adsorbed on organisms, under controlled conditions for the treatment of disease.

Another object of the invention is to provide a process and apparatus for producing nuclei for larger ions and affixing ions to said nuclei.

A further object of the invention is to provide a process and apparatus for producing a nucleus that has a therapeutic value in itself, affixing ions of chosen polarity thereto and adsorbing the so-formed ions on surfaces of an organism for therapeutic purposes.

Other objects, novel features and advantages of this invention will become apparent from the following specifications and accompanying drawings, wherein:

Fig. 1 is a perspective view illustrating the manner of use of an apparatus for producing negative ions according to the invention;

Fig. 2 is a plan view of the apparatus;

Fig. 3 is a section taken substantially on the line 3—3 of Fig. 2;

Fig. 4 is a fragmentary section substantially on the line 4—4 of Fig. 2;

Fig. 5 is a rear elevation;

Fig. 6 is a fragmentary section substantially on the line 6—6 of Fig. 2;

Fig. 7 is an enlarged section through the vaporizer taken substantially on the line 3—3 of Fig. 2;

Fig. 8 is a section substantially on the line 8—8 of Fig. 7;

Fig. 9 is a fragmentary section on the line 9—9 of Fig 7;

Fig. 10 is a perspective view of a portion of the vaporizer, and

Fig. 11 is a wiring diagram of the electric circuits.

The apparatus is housed in a cabinet 10 having a horizontal shelf 11 and a top 12. The back wall of the cabinet extends above the top 12 and to it is hinged a cover 13 which has depending side and front walls which engage the top 12, the cover and its top and front walls being composed mainly of transparent material such as glass, set in a suitable frame. In the lower part of the cabinet below the shelf 11 is arranged a blower 14 driven by an electric motor 15. The blower 14 has two outlets of different size. The larger outlet communicates with a duct 16 which in turn communicates with a channel 17 in a panel 18, the panel being made of two vertically arranged plates of insulating material such as hard rubber, the plates having opposed grooves which form the channel 17. A disk 19 of suitable insulating material is fastened to one face of the panel and forms a support for and is enclosed by one end of a metal tube or conductor 20, the other end of the metal tube being supported by a collar or sleeve 21 of insulating material arranged in an aperture in one side wall of the cabinet. Outlets 17*a* lead from the channel 17 through disk 19 into the tube 20. The sleeve 21 is rotatable about its axis and carries a horn 22. In the left end of the tube 20 is mounted a spider 23 of insulating material and a fine electrical conductor or small diameter wire 24 is supported axially of the tube by the members 25 and 26 mounted respectively in the spider 23 and disc 19. Suitable tensioning means are incorporated in the member 25 to maintain the conductor 24 in taut condition.

The smaller outlet of the pump 14 communicates with a pipe 16*a* which is connected to a nipple 16b extending through the shelf 11. A ring 27 of insulating material is secured to the upper surface of shelf 11 and surrounds the upper end of the nipple 16b. A similar ring 28 is secured to the lower surface of the top 12 with a gasket 29 interposed between the ring and the top. The ring 28 surrounds the lower end of a nipple 30 mounted in the top 12 and projecting thereabove. An interiorly threaded collar 31 fits within the ring 28 and engages the gasket 29. The interior threads of collar 31 engage threads on cap 36 and the collar 31 fitting within ring 28 forms the upper support for an ozonizer O.

The ozonizer O consists essentially of a closed metal cylinder 32 mounted on a rod 33 supported in caps 35 and 36 received respectively by rings 27 and 31. The cylinder 32 is surrounded by a suitably spaced concentric metal tube or cylinder 37 and within the annular space between cylinder 32 and cylinder 27 a concentric glass tube 34 is supported on caps 35 and 36. The walls of the glass tube 34 are preferably spaced equally distant from the outside wall of cylinder 32 and from the inside wall of tube or cylinder 37. The ozonizer, as shown, is of a conventional brush discharge type and air is caused to pass between the metal cylinder 32 and the glass tube 34 and also between the metal tube 37 and the glass tube 34, with proper voltage applied to the tubes 32 and 37 to cause a brush discharge therebetween.

On the upper face of the top 12 is arranged a metal plate 38 through which passes the nipple 30 as well as a second nipple 39. The nipples 30 and 39 are held in place by bushings 40 and are provided with annular flanges 41 which clamp the plate 38 against the top 12.

A vaporizing member V rests on plate 38 and consists of a metal pan 42, a cover 45, a rotating cap or valve 58 and a liquid reservoir 48 removably mounted in valve 58 and rotating with said valve. The top of plate 38 and the bottom of pan 42 are preferably ground flat so as to make a vapor tight contact. The metal pan 42 has bosses 43 and 44 mounted thereon which bosses, respectively, surround the nipples 30 and 39. The cover 45 has domes 46 and 47 which receive the bosses 43 and 44. A port 49 is provided in cover 45 and a port 49a is provided in rotating valve 58. When port 49 and port 49a register with each other liquid can flow from the liquid reservoir 48 into pan 42. The nipple 39 communicates with a pipe 50 which in turn communicates with a tubular fitting 51 extending through the panel 18 and disc 19 into the tube 20. The fitting 51 has a downwardly opening port 52 and is arranged directly above the wire 24.

The cover 45 fits within the pan 42 and forms a vaporizing and reaction chamber therebetween. Cover 45 is provided with a plurality of baffles to cause the gases and vapors passing through the vaporizer to traverse a circuitous path between the nipples 30 and 39 and to effect intimate contact of the gases and vapors with the liquid in the pan. A nearly circular flange 45a depends from the under surface of the cover 45 concentric with the dome 46 and opens toward the right end of the pan 42. A similar flange 53 is concentric with dome 47 and depends from the cover 45 and opens toward the left end of the pan 42. In between the flanges 45a and 53 are arranged transverse flanges 54 and 55 which extend from both edges of the cover toward the center thereof. A boss 56 depends from the cover 45 and is arranged around the port 49. The boss 56 is cut away at one or more places 57 to provide a sharp edge. On the upper face of the cover 45 and offset from the boss 56 is arranged the cap or valve 58 having a circular groove in which fits an annular flange 58a extending upwardly from the cover 45, a bolt 58b holding the cap 58 permanently attached to the cover 45. The reservoir 48 comprises a vial or bottle having a threaded neck screwed into the cap 58. When the port 49a of the cap is in register with the port 49, liquid will flow from the reservoir 48 into the pan 42 until it rises to approximately the level of the sharp edges 57 and such level will be maintained as long as liquid remains in the reservoir.

In the use of the above-described apparatus for the production of negative ions, air is forced by the blower 14 through the duct 17 into the tube 20 and also by way of the ozonizer O and vaporizer V and pipe 50 into the tube 20, the stream of air passing through the duct 17 preferably being of greater volume than the stream of air passing through the ozonizer. The stream of air passing through the ozonizer is subjected therein to the brush discharge with the formation of ozone and both positive and negative ions. From the ozonizer the air stream passes into the vaporizer through the nipple 30 in the bottom thereof, thence flows in a circuitous path in contact with the liquid in the vaporizer and out through the nipple 39. Preferably the liquid in the vaporizer contains fractions that are reactive with ozone in which case both reaction and vaporization are brought about in the vaporizer. By means hereinafter described, a negative voltage potential is applied to metal plate 38 and to the nipples 30 and 39 and such negative voltage is communicated to the vaporizer V. Such a negative voltage withdraws positive ions from the ozone carrying stream escaping from the ozonizer and also removes any positive ions formed by reaction or vaporization within the vaporizer by adsorption of the positive ions on the negatively charged walls. The vaporized liquid particles and the vaporized products of reaction with some negative ions in association pass with the air stream out of the vaporizer through the bottom thereof into pipe 50, thence through fitting 51 and into tube 20, and in this tube are commingled with the air supplied to the tube 20 by way of duct 17.

Pulsating negative voltage is supplied to the member or electrode 24 through the lead 24a and conductor 24b from a source subsequently to be described. An intense electrical field is formed around the electrode 24 and negative electrons escape therefrom into the surrounding medium which consists of vaporized particles, particles formed by reaction in the vaporizer and air. Intense ionization of the air and particles takes place by the action of the field and both positive and negative ions are formed. The positive ions are adsorbed on the negatively charged member 24 and also on the surface of tube 20 which also attains a negative voltage potential as will be described hereinafter. Remaining negative ions in part settle upon and cluster around the vaporized particles and the particles formed by reaction and such particles then become the nuclei of larger ions of low mobility. Free negative electrons escaping from member 24 also become attached to particles of the medium within tube 20 and assist in forming negative ions. Accordingly, there escapes from tube 20 negative air ions and large ions containing nuclei consisting of particles formed by vaporization and reaction within the vaporizer. The stream of ion containing gas is discharged from tube 20 into and through the horn 22 and may be directed as desired.

Figure 3:
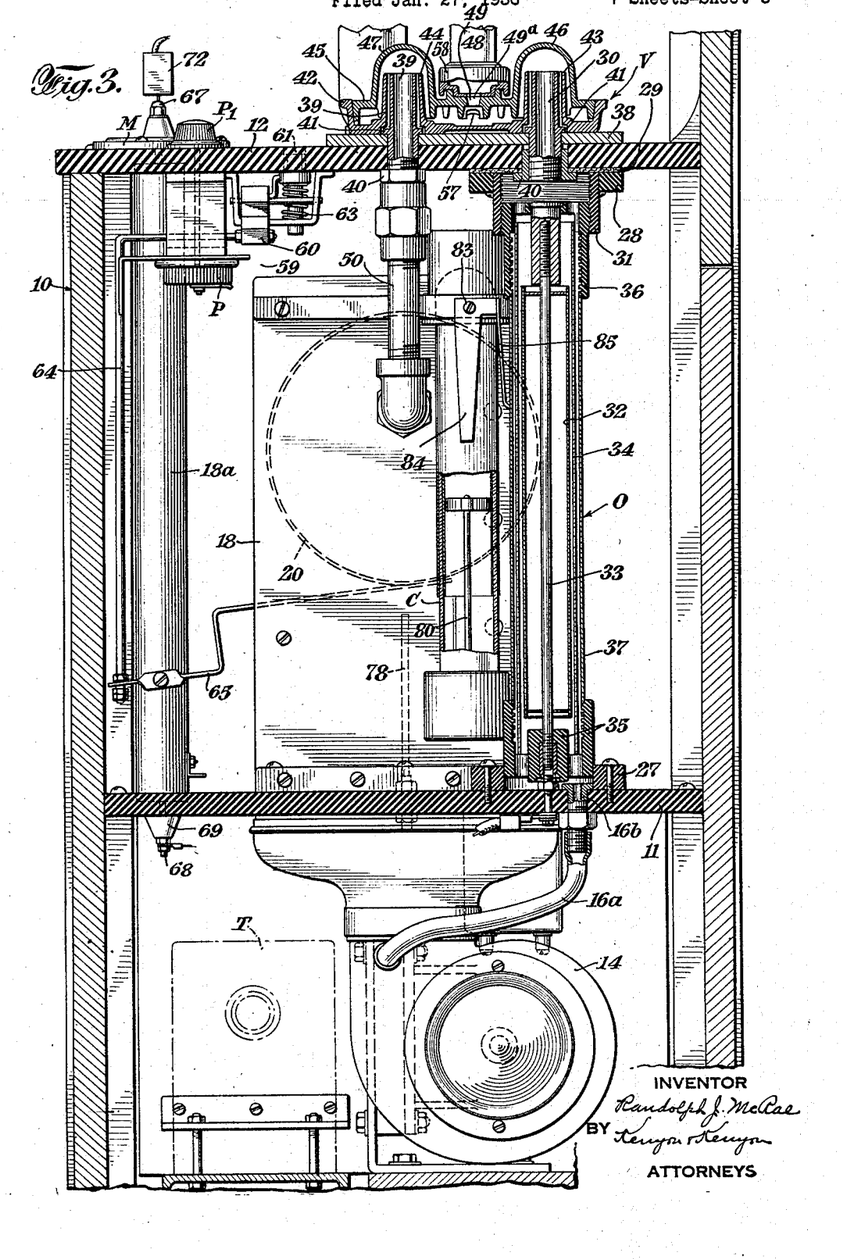
Figure 4:
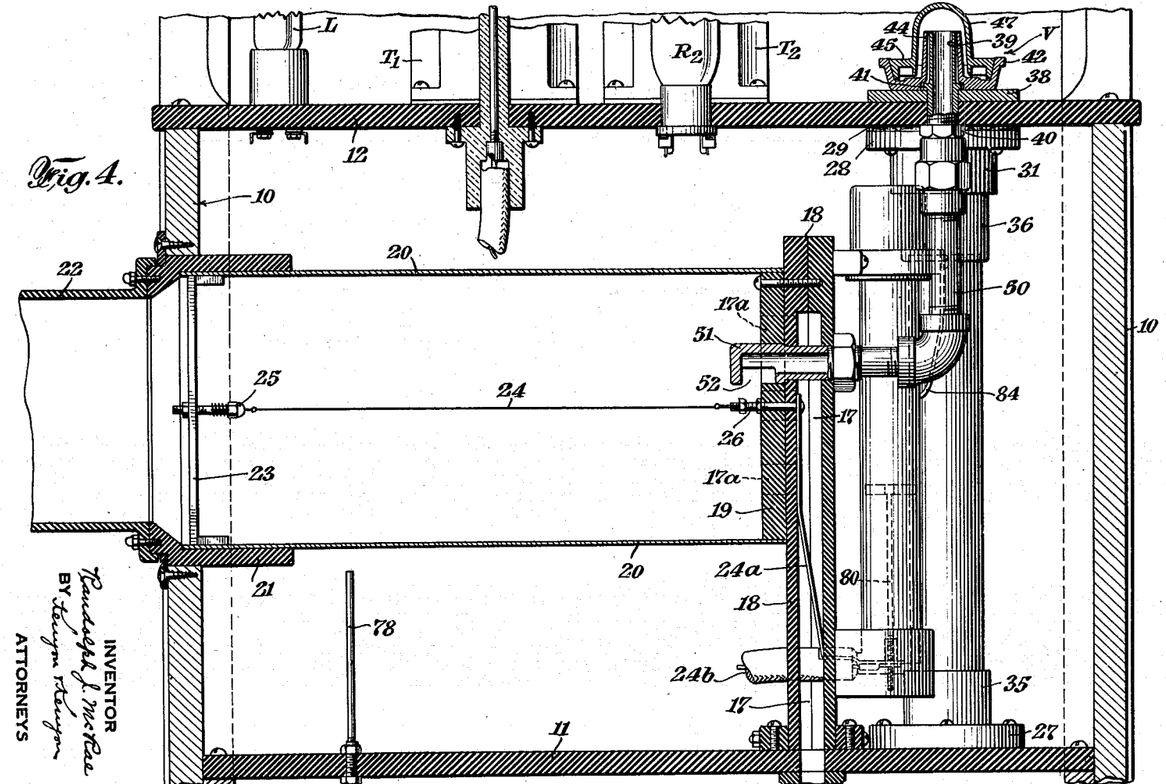
Figure 5:
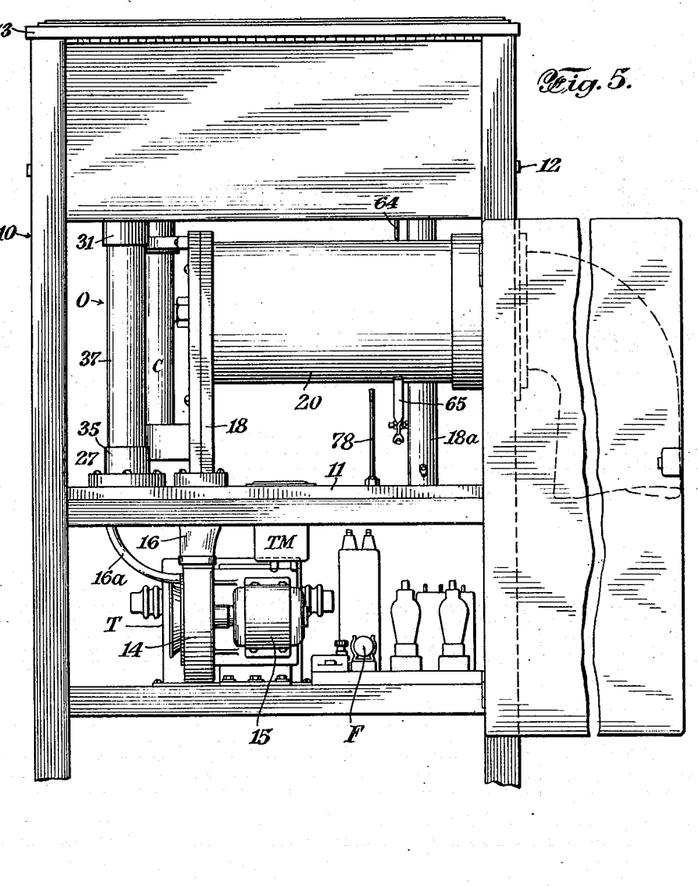
Figure 6:
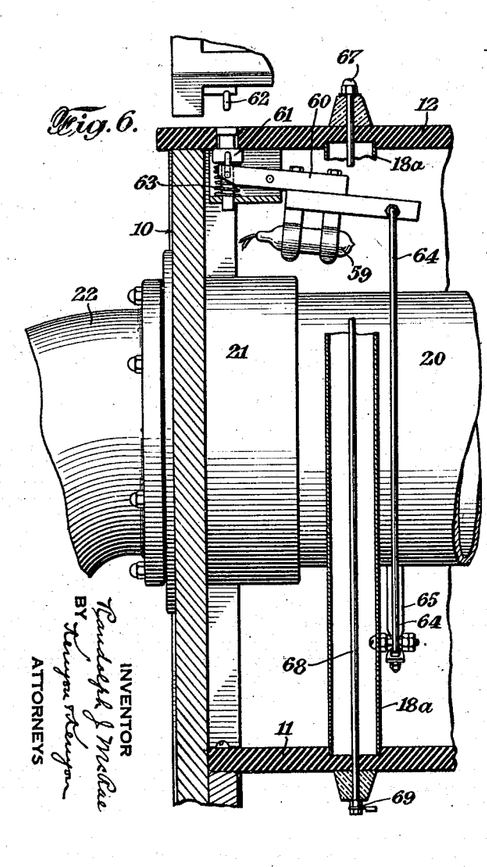
Figure 7:
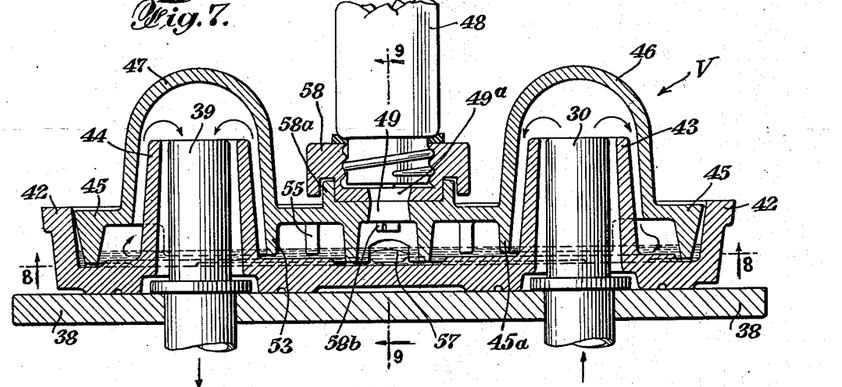
Figure 8:
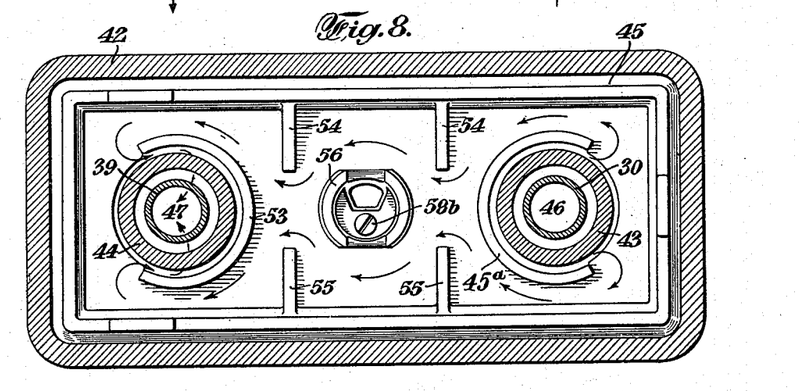

The negative pulsating voltage supplied to conductor 24 originates from the transformer T. One side of the secondary of said transformer is connected to the filament of a high voltage rectifier R2 and also to the inner metal tube 32 of ozonizer O through rod 33, the connection being made by a conductor 33a leading to the bottom of the rod as shown in Fig. 3. The plate of rectifier R2 is connected to the filament of a second rectifier R1. For convenience, two rectifiers are shown in series, but it will be understood that one rectifier of sufficiently high inverse peak voltage rating will suffice. From the plate of rectifier R1, the conductor 24b leads to the bottom of a rod 80 extending into and making electrical contact with the inner plate of condenser C, and the conductor 24a continues from the conductor 24b to the electrode 24. The other side of the secondary of transformer T is connected to the outside plate of condenser C which is connected to the outer metal tube 37 of ozonizer O through contact 83 having arms 84 and 85. It is thus seen that the ozonizer acts as a spark gap across the secondary leads of transformer T and causes fluctuations in the wave of the sinusoidal current applied to condenser C and passing through the rectifiers. The primary of said transformer is connected to any suitable outlet of 110-220 volt alternating current through a panel switch and a mercury switch subsequently to be described and through a series-parallel bank of lamps by means of which the current supplied to the primary may be controlled.

The rectifiers R1 and R2 perform the function of a valve and will permit only negative electrons to flow through them into conductor 24 and into condenser C which becomes a reservoir for said negative electrons. When negative electrons are so flowing into condenser C the other side of said condenser is positively charged. The flow of the negative electrons into conductor 24 causes a strong field around said conductor and the emission of electrons therefrom with resulting ionization of the surrounding medium.

When the current changes, positive charges cannot flow through the rectifiers from the filament to the plate, neither can the negative electrons in condenser C and wire 24 flow back from the plate to the filament. The negative electrons previously stored in condenser C are now repelled from said condenser and cause a pulsation on conductor 24 with a resulting field around said conductor and the emission of negative electrons therefrom with resulting ionization of the surrounding medium.

The conductor 24 is surrounded by a metal tube 20 which not only serves as a conduit for the stream of vapors, nuclei, and ion-containing air, but also has an important function in the formation of the ions. Tube 20 is insulated from all electrical circuits and from earth. In operation it attains a negative voltage potential caused by the adsorption thereon of negative ions liberated and formed by conductor 24 and the field surrounding it. The tendency is for the negative voltage potential on tube 20 to approach in magnitude the negative voltage potential on conductor 24 with resulting decrease in the field and in the number of ions escaping from horn 22. A certain amount of leakage from tube 20 occurs into the air and the production of ions therewithin will continue when the tube 20 is thoroughly insulated. The conduit and electrode are concurrently maintained at a negative potential with respect to earth.

A greater number of ions will be formed and escape from horn 22 if the excess charge gathered by tube 20 is allowed to escape in the following manner. A rod 78 is connected to earth and is supported by shelf 11 with its free end forming a spark gap with the tube 20. When tube 20 attains a sufficient voltage potential, current will jump the gap. In this manner, the voltage potential on tube 20 undergoes rapid changes and affects the field surrounding the electrode 24 and the emission of electrons therefrom at a frequency higher than the frequency of the current in the secondary of transformer T. The number of ions produced is a function of frequency and so the imposing of a high frequency causes an increase in the number of ions produced.

In the operation of the device without the ground leak 78, there is first imposed on the wire 24 a potential due to the half wave of the sinusoidal current having passed through the rectifiers and being stored in the condenser. When the current changes sign, no current passes through the rectifiers, but the condenser is then discharged into the wire 24. It is seen, therefore, that during one cycle of the current at least two impulses are impressed on the wire 24. The condenser discharge on to the wire 24 appears to be more effective than the half-wave of the sinusoidal current because more ions are produced when the condenser is operating than are produced when the condenser is disconnected from the circuit. If the ground leak 78 is in operation, there is also the effect of a charge building up on the tube 20 and discharging across the gap to the rod 78. This building up and running off of the charge on tube 20 to rod 78 takes place at a much higher frequency than the frequency of the current imposed on the wire 24. As the voltage runs off tube 20, it will permit more current to flow into wire 24, thereby causing an increase in the field strength around wire 24. When the potential is building up on tube 20, it will cause a decrease in the flow of current in wire 24, thereby causing a decrease in the field strength around wire 24. In other words, the difference between the voltage potential on wire 24 and tube 20 varies at high frequency. Accordingly, the current imposed on wire 24 due to the sinusoidal current and the condenser discharge become in effect a carrier wave on which are imposed relatively high frequency variations. The rate of such high frequency variations depends on the width of the gap between rod 78 and tube 20. The degree of ionization in a unit of time is a function of the frequency and accordingly, the effect of the ground rod 78 is to increase the ionization. The tube 20 will always maintain a negative potential with respect to earth, depending on the breakdown voltage of the gap between the tube 20 and rod 78. The spark gap formed by the ozonizer is effective to increase the ionization produced by the electrode 24.

Good operation has been obtained with a voltage of 12,000 volts RMS on the secondary of transformer T, with conductor 24 having a diameter of one mil, with tube 20 having a diameter of seven inches and rod 78 being about one half inch from tube 20. The apparatus is wired preferably with ground as neutral, with positive voltage above ground and negative voltage below ground.

The negative voltage on the vaporizer is obtained by connecting plate 38 to the tube 20.

A mercury switch 59 is carried by one end of a lever 60 pivoted intermediate its ends and having a stud 61 engageable by a stud 62 on cover 12. A spring 63 normally tends to hold the lever 60 in such position that the mercury switch is open. The lever remains in such position so long as the cover 12 is lifted but when the cover 12 is lowered then the stud 62 engages the stud 61 thereby turning the lever 60 against the action of the spring 63 into such position as to close the mercury switch 59. This arrangement automatically opens the circuit through the transformer primary upon raising of the cover 12 and protects against shock. The lever 60 is also connected by a link 64 with a pivoted arm 65 connected to earth, one end of which arm is adapted to engage and discharge the tube 20 whenever the lever 60 is moved into such position that the mercury switch 59 is opened. This arrangement prevents any possibility of a shock from the tube 20 or vaporizer V by a charge remaining on the tube 20 and vaporizer V when the apparatus has been shut down after a period of use. The switch 66 also provides a means of opening the circuit through the transformer primary and is to be manually operated to control operation of the apparatus.

Heating current for the cathodes of the rectifiers $R_1$ and $R_2$ is obtained from the secondaries of transformers $T_1$ and $T_2$ bridged across the 110 volt circuit and the motor 15 for the blower 14 is likewise bridged across the 110 volt line. The primaries of the transformers $T_1$ and $T_2$ are in series with the panel switch 66 while the blower motor 15 is in series with both the panel switch and mercury switch 59. A time meter TM is connected across the 110 volt line in series with the panel switch 66 for recording the length of time the apparatus is in use.

Figure 1:
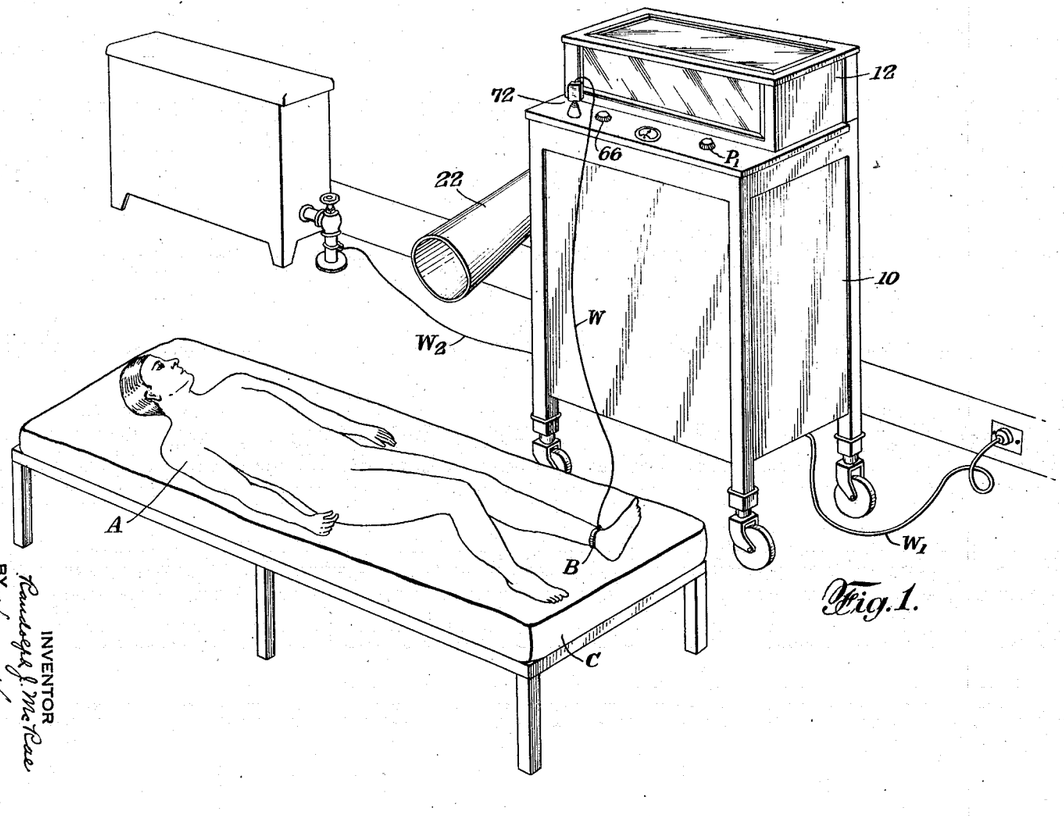
Figure 2:
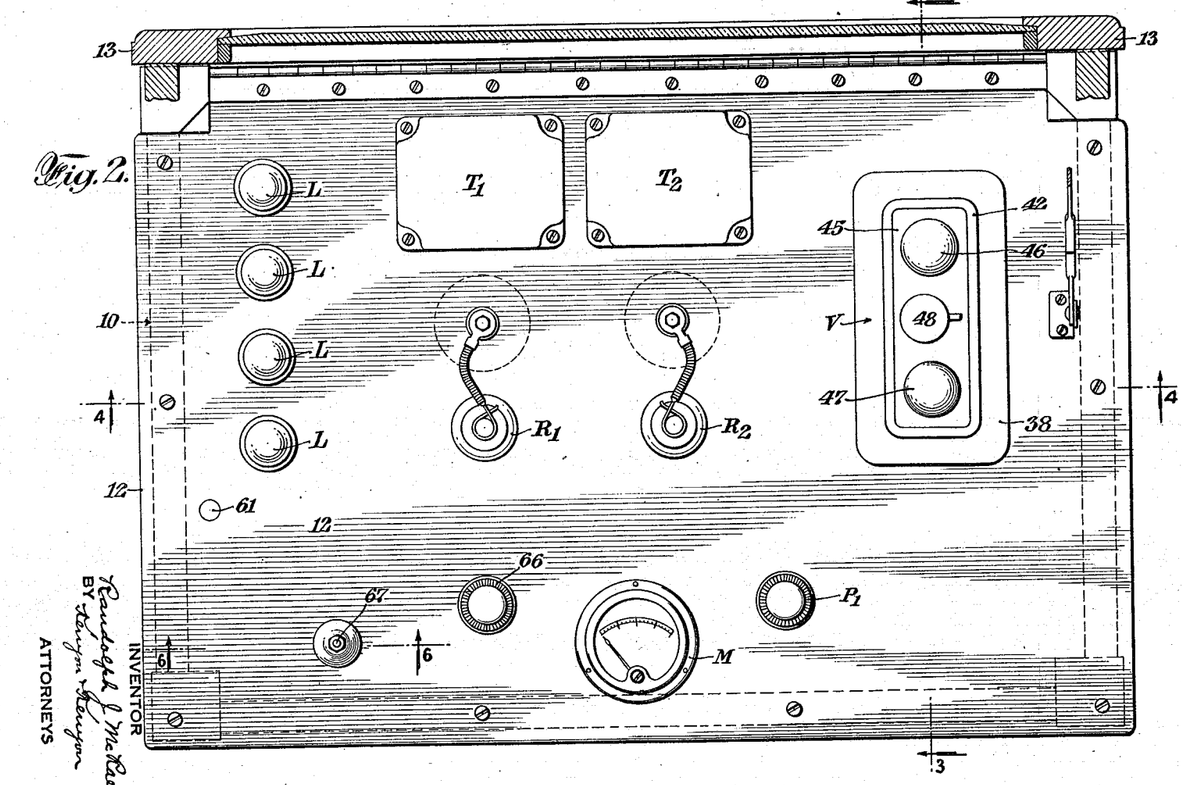

In the use of the apparatus for the adsorption of negative ions as described on an organism and for the causing of radiation on the surfaces of an organism, the organism is supported by a suitably insulated support and a positive voltage potential applied to said organism (Fig. 1). The stream of ion containing air and nuclei escaping from horn 22 is directed onto the organism.

A terminal 67 is mounted on the top 12 and to it may be connected a suitable conductor leading to the organism. A rod 68 leads from the terminal 67 to a second terminal 69 mounted on the lower side of shelf 11. A metal tube 18a surrounding rod 68 and grounded to earth shields rod 68 from the field of conductor 24 and tube 20.

The positive voltage imposed on the organism may be obtained in the following manner: The terminal 69 is connected through resistance 70 to one side of a condenser $C_1$ of suitable capacity and is also connected to one side of the secondary of a step up transformer $T_4$. The other side of said secondary of transformer $T_4$ is connected to the filament of rectifying tube $R_3$. The plate of rectifier $R_3$ is connected through fuse F to earth and the other side of condenser $C_1$ which side is also connected through a voltmeter M and its resistance 71 to the first mentioned side of condenser $C_1$. Testing with a cathode ray oscillograph has shown that a positive direct current voltage potential of less than 1/10 volt variation is imposed on terminal 68 by the hook-up as described.

Heating current for the filament of rectifier $R_3$ is supplied from the secondary of the transformer $T_3$, the primary of which is bridged across the 100 volt A. C. line in series with the switch 66, primary of transformer $T_1$ and the full winding of potentiometer P. The voltage imposed on the terminal 68 is supplied from the secondary of transformer $T_4$, the primary of which is bridged across the 100 volt A. C. line in series with the switch 66, primary of transformer $T_1$ and a variable portion of the winding of potentiometer P so that the voltage may be regulated as desired and read on the voltmeter M.

A bank of lamps L is mounted on the top 12 together with the transformers $T_1$ and $T_2$ as well as rectifiers $R_1$ and $R_2$. The panel switch 66 and the control button $P_1$ for the potentiometer as well as the meter M are likewise mounted on the top 12. Also, as previously pointed out, the vaporizer and its bed plate 38 are mounted on top 12, thus locating all these elements in a position to be readily accessible merely by raising cover 13.

In some instances it is desirable that the voltage potential on the organism be interrupted. A clock mechanism for periodically making and breaking the circuit to the organism is shown at 72.

Ionization is increased by having the ozonizer O connected in shunt to the secondary of the transformer T as the formation of a spark thereacross causes fluctuation of the wave formed of the sinusoidal current passing through the rectifiers $R_1$ and $R_2$ and also causes fluctuation of the current imposed on the outer plate of the condenser C.

In Fig. 1 is illustrated the manner of use of the apparatus for treating a person according to the process of the invention. The patient A reclines on a couch C suitably insulated from ground and a metallic band B is applied around an ankle or wrist, this band being connected by suitable lead wire W with the terminal 67. The horn 22 is properly located to direct the stream of ion-bearing fluid to a selected part of the patient's anatomy, such part of the anatomy, of course, being uncovered, although the remainder of the patient's body may be suitably covered. Electrical current from the ordinary household circuit is supplied through a suitable lead wire $W_1$ plugged into the standard outlet and the rod 78 and the midpoint of the primaries of the transformers T, $T_1$, $T_2$ and the transformers $T_3$ and $T_4$ are grounded, for example, by a suitable lead wire $W_2$ connected to a radiator or the like. By means of the panel switch 66, current to the apparatus is turned off and on and by means of the button $P_1$ the potential applied to the patient is controlled. The potential applied to the patient may be periodically interrupted by means of the clock mechanism 72 and the raising of the cover 12 automatically opens the switch 59 to de-energize the motor for the blower 15 and the transformer T. The bank of lamps L determines the strength of the current flow through the primary of the transformer T.

I claim:
1. An apparatus for producing ions which comprises a circuit including a source of unidirectional current, a conduit, an electrode therein, means to impress said unidirectional current on said electrode, means for flowing a stream of gas through said conduit, and means for imposing a high frequency fluctuation of voltage on said conduit.

2. An apparatus for producing ions which comprises an insulated metal conduit, a conductor extending axially thereof, means to impress successive negative voltage impulses on said conductor, means to flow a stream of gas through said conduit, an ionizer, a liquid reservoir, means to flow a second stream of gas first through said ionizer and then through said reservoir in contact with liquid therein and finally into said conduit, means to impress negative voltage on said reservoir, and conducting means connecting said conduit and reservoir for impressing negative voltage acquired by said conduit on said reservoir.

3. An apparatus for contacting an organism with ions which comprises an insulated metal conduit, a conductor extending axially thereof, means to impress successive negative voltage impulses on said conductor, means to flow a stream of gas through said conduit, an ionizer, a liquid reservoir, means to flow a second stream of gas first through said ionizer and then through said reservoir in contact with liquid therein and finally into said conduit, conducting means connecting said conduit and reservoir for impressing negative voltage acquired by said conduit on said reservoir, means to direct the gas stream emerging from said conduit into contact with said organism, and means for applying positive voltage potential to said organism.

4. The apparatus according to claim 3 in which said ionizer is an ozonizer and the reservoir contains liquid reactive with ozone.

5. An apparatus according to claim 2 wherein the means to impress successive negative voltage impulses on said conductor comprises a source of alternating current, a condenser and vacuum tube rectifier series connected therewith, and means for connecting said conductor between said condenser and the anode of said rectifier.

6. An apparatus according to claim 3 wherein the means to impress successive negative voltage impulses on said conductor comprises a source of alternating current, a condenser and vacuum tube rectifier series connected therewith, and means for connecting said conductor between said condenser and the anode of said rectifier.

7. An apparatus for producing ions which comprises a metal conduit, a conductor extending axially thereof, a source of alternating current, a condenser and vacuum tube rectifier series connected therewith, means for connecting said conductor between said condenser and the anode of said rectifier, means to flow a stream of gas through said conduit, an ozonizer, a reservoir containing liquid reactive with ozone, means to flow a second stream of gas first through said ozonizer and then through said reservoir in contact with liquid therein and finally into said conduit, means to impress negative voltage on said reservoir and a grounded electrode forming a spark gap with said conduit.

8. An apparatus for producing ions which comprises a metal conduit, a conductor extending axially thereof, a source of alternating current, a condenser and vacuum tube rectifier series connected therewith, means for connecting said conductor between said condenser and the anode of said rectifier, means to flow a stream of gas through said conduit, an ozonizer, a reservoir containing liquid reactive with ozone, means to flow a second stream of gas first through said ozonizer and then through said reservoir in contact with liquid therein and finally into said conduit, and conducting means connecting said conduit and reservoir for impressing negative voltage acquired by said conduit on said reservoir.

9. An apparatus for contacting an organism with ions which comprises a metal conduit, a conductor extending axially thereof, a source of alternating current, a condenser and vaccum tube rectifier series connected therewith, means for connecting said conductor between said condenser and the anode of said rectifier, means to flow a stream of gas through said conduit, an ozonizer, a reservoir containing liquid reactive with ozone, means to flow a second stream of gas first through said ozonizer and then through said reservoir in contact with liquid therein and finally into said conduit, conducting means connecting said conduit and reservoir for impressing negative voltage acquired by said conduit on said reservoir, means to direct a gas stream emerging from said conduit into contact with said organism, and means for applying positive voltage potential to said organism.

10. An apparatus for ionizing a gas comprising a circuit including a source of pulsating unidirectional current and a condenser, an insulated metal conduit, an electrode therein connected to said circuit between said source and said condenser, means for flowing a stream of gas through said conduit, and means for varying the voltage on said conduit at a higher frequency than the frequency of pulsation of said pulsating unidirectional current.

11. An apparatus for ionizing a gas comprising a circuit including a source of pulsating unidirectional current and a condenser, an insulated metal conduit, an electrode therein connected to said circuit between said source and said condenser, means for flowing a stream of gas through said conduit, and a grounded electrode forming a spark gap with said conduit.

12. An apparatus for ionizing a gas comprising an insulated metal conduit, a conductor extending axially thereof, means for applying voltage impulses to said conductor, said means comprising a source of alternating current, a vacuum tube rectifier and a condenser series connected therewith, means for connecting said conductor between the anode of said rectifier and said condenser, and means for varying the voltage on said conduit at a higher frequency than the frequency of pulsation of said pulsating unidirectional current.

13. An apparatus for ionizing a gas comprising an insulated metal conduit, a conductor extending axially thereof, means for applying voltage impulses to said conductor, said means comprising a source of alternating current, a vacuum tube rectifier and a condenser series connected therewith, means for connecting said conductor between the anode of said rectifier and said condenser, and a grounded electrode forming a spark gap with said conduit.

14. Apparatus for producing ions which comprises an insulated metal conduit, a conductor extending axially thereof, means to impress successive negative voltage impulses on said conductor, means to flow a stream of gas through said conduit, an ionizer, a liquid reservoir, means to flow a second stream of gas first through said ionizer and then through said reservoir in contact with liquid therein and finally into said conduit, means to impress negative voltage on said reservoir, and a grounded electrode forming a spark gap with said conduit.

15. Apparatus for adsorbing ions on an organism which comprises an insulated metal conduit, a conductor extending axially thereof, means to impress successive negative voltage impulses on said conductor, means to flow a stream of gas through said conduit, an ionizer, a liquid reservoir, means to flow a second stream of gas first through said ionizer and then through said reservoir in contact with liquid therein and finally into said conduit, means to impress negative voltage on said reservoir, and a grounded electrode forming a spark gap with said conduit.

16. An apparatus according to claim 2 wherein the means to impress successive negative voltage impulses on said conductor comprises a transformer having a condenser and vacuum tube rectifier series connected with the transformer secondary, means connecting said ozonizer in parallel with the transformer secondary as a spark gap, and means for connecting said conductor between said condenser and the anode of said rectifier.

17. The method of producing negative ions which comprises flowing a stream of air through an insulated metal conduit containing an axial electrode, impressing pulsating negative voltage on said electrode and discharging negative charges from said conduit at a higher frequency than the frequency of pulsation of said negative voltage.

18. The method of producing negative ions which comprises flowing air through an insulated metal conduit containing an axial electrode, impressing pulsating negative voltage on said electrode, and concurrently maintaining said conduit and electrode at negative potential with respect to earth and discharging negative charges from said conduit at a higher frequency than the frequency of pulsation of said pulsating negative voltage.

RANDOLPH J. McRAE.